(No Model.)
P. W. ESTES.
GATE.
No. 368,661. Patented Aug. 23, 1887.
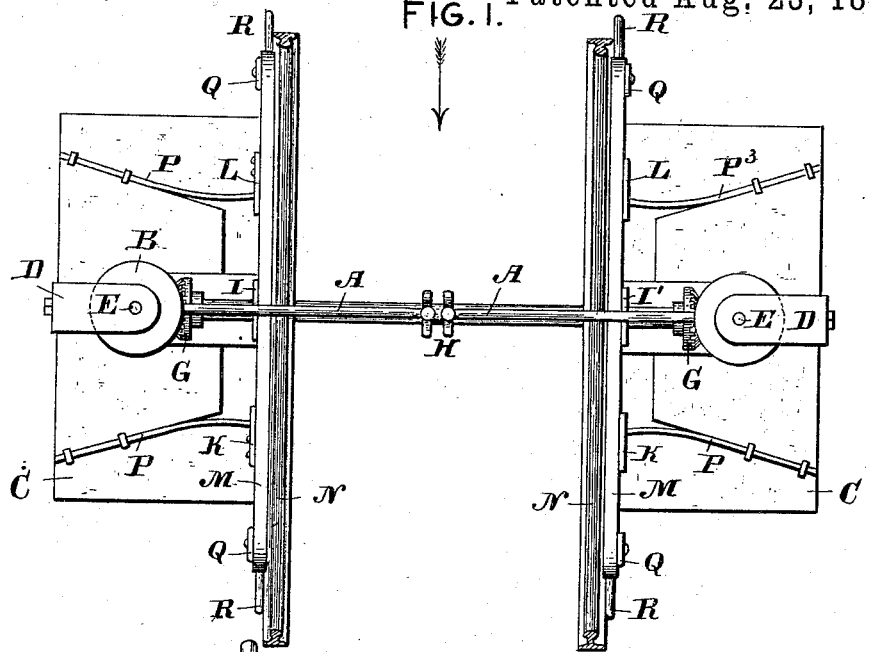
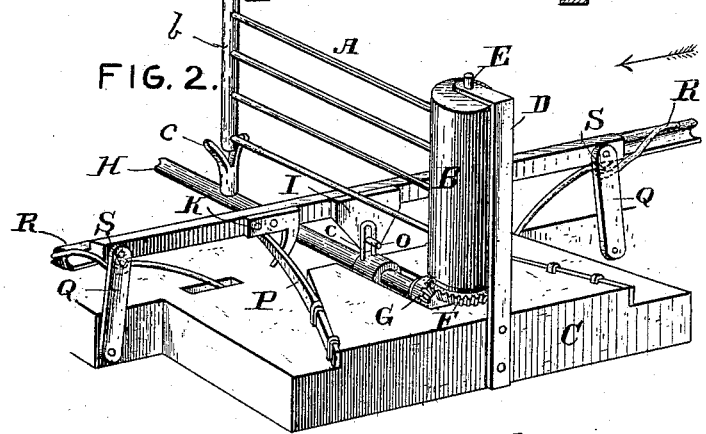
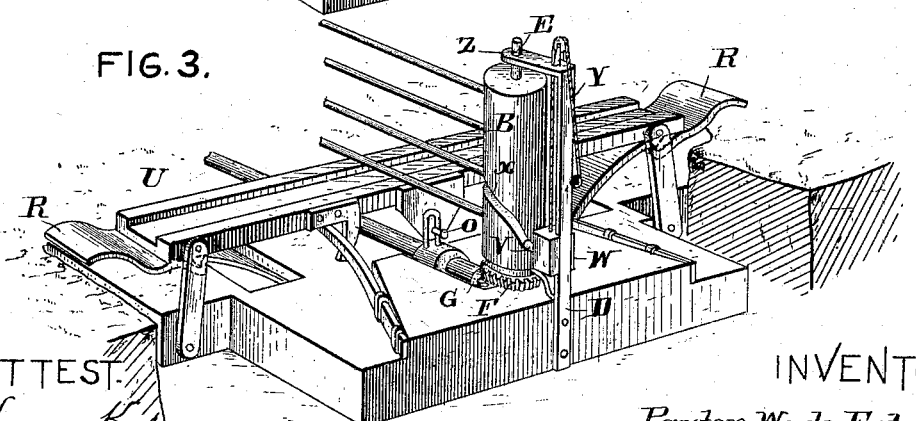
ATTEST
J. Henry Kaiser
Victor J. Evans.
INVENTOR
Payton Wade Estes.
By J. W. Houghton
Attorney

UNITED STATES PATENT OFFICE.

PAYTON WADE ESTES, OF HIAWATHA, KANSAS, ASSIGNOR OF ONE-HALF TO EVERARD BIERER, OF SAME PLACE.

GATE.

SPECIFICATION forming part of Letters Patent No. 368,661, dated August 23, 1887.

Application filed June 14, 1887. Serial No. 241,253. (No model.)

*To all whom it may concern:*

Be it known that I, PAYTON WADE ESTES, a citizen of the United States, residing at Hiawatha, in the county of Brown and State of Kansas, have invented certain new and useful Improvements in Gates; and I do hereby declare the following to be a full, clear, and exact description of the invention, such as will enable others skilled in the art to which it appertains to make and use the same.

My invention relates to an improvement in gates the opening and closing of which is controlled by a passing vehicle, and is designed for use on railroads or across the driveways leading to an inclosed area of ground.

The object of the invention is to produce a simple and reliable mechanism for operating the gate by the passing vehicle itself without necessitating the presence of an attendant, to restore the gate with certainty to its normal closed condition after the passage of the vehicle, to lock the gate against interference of meddlesome persons, and in the case of a farm-gate to permit its being easily opened by pedestrians who understand its mode of operation. By such provisions I secure an efficient guard against cattle or other beasts for the premises protected.

To this end my invention embodies novel means of operating a gate by a passing vehicle itself. My invention also embodies additional means for operating such an automatic gate by hand when desired, the features which I regard as new being hereinafter fully described in the specification, and definitely indicated in the claims.

In the drawings accompanying this specification, Figure 1 is a top plan view of my invention as applied to one side of a railroad-crossing. Fig. 2 is a view in perspective of one side of the gate shown in Fig. 1, the road-bed being removed, better to illustrate the arrangement of the parts. Fig. 3 is a view in perspective of one side of a modified form of my invention, which is particularly adapted for use on farms or other large inclosures, showing means by which the gate can be operated by hand as well as by a passing vehicle.

Like letters of reference indicate like parts throughout the drawings.

I will first describe the form illustrated in Figs. 1 and 2, and will then show how such a form can be modified to answer the use recited in connection with the mention of Fig. 3.

A series of gate rods or rails, A A, of sufficient strength to meet the requirements of ordinary service, are mounted on posts B B, set at the side of the roadway. These gate rods or rails may be braced and supported at their ends and be attached to an upright bar, $b$, which, when the gate is closed, will rest in and be secured by a bifurcated pin, C, on horizontal bar H in the center, and be locked on the same when shut. These posts are journaled in suitable bearings, the upper one of which only appears in the drawings. A pin projecting from each end of each post engages the bearings, the lower one resting in a socket in the supporting-bed C, Fig. 2, and the upper one in a horizontal extension of a bracket, D, Figs. 1 and 2, suitably secured to the bed-plate. The posts B B are rotated by bevel-gearing F G, one member of the gearing being secured to the post and the other to a horizontal rod, H, extending across the road. Parallel with and contiguous to the outside of each rail of the track are bars M M, (see Fig. 1,) pivotally secured to a supporting-bottom by pivots Q. These bars normally rest slightly above the level of the rails, and the links are given a slight inward inclination, as shown in Fig. 2, so that when a car or train approaches in either direction the pressure on the lower pivots will not be vertical and the bar will receive a longitudinal thrust under the weight of the vehicle. Lugs S S, Fig. 2, on the bars M M rest in recesses in the lock-springs R R, which normally lock the bars M M against displacement. These locking-springs each have one end secured to a bed-block, and their free ends extend parallel to the rail and normally lie above the level of the same, so that an approaching car will first depress the springs R R, which lie in its path, thus unlocking the bars M M, so that they may easily shift under the weight of the passing vehicle. Each of these bars M carries depending lugs K L, which engage with springs P when the bars are shifted. These springs are preferably secured to the bed-plate, as shown, though of course any disposition which would hold the shifting bars elastically and return them to their normal position after displacement might be adopted. A depending lug, I, on each bar carries a pin working in guides O O, secured to the transverse bar H, before described. The guides are made long enough to prevent the pin slipping out, or may be bridged at the top, as shown in Fig. 2.

The operation of the gate will now be understood. Suppose a train be moving in the direction of the arrow shown in Figs. 1 and 2. As soon as the wheels of the car or engine meet the springs R R the latter are depressed by the treading-face of said wheels, and the next moment the bars M are thrust forward by the wheels riding thereon. The bars are made as long as the distance between the successive car-wheels, so that while the train is passing they will be continuously held depressed. The shifting of the bars M gives a partial turn to rod H and opens the gate. During this time one set of springs, P, are under tension, and when the train has passed will force the bars back until the lugs S underneath the ends of the bars fall into the recesses in the springs R, when the gate will be locked, as before its operation. These locking-springs are of great service on railroads in preventing interference on the part of malicious or meddlesome persons, and should be made stout enough to require heavy weights to depress them.

It will be understood, of course, that each side of a roadway where it crosses a railroad has a pair of gates, and that in some cases it may be practicable to use a single gate long enough to span the track in lieu of the double gate shown in Fig. 1. The operative principle in both cases is identical with that described, and further description or illustration of the same will therefore be unnecessary.

A slight variation is made where the gate is to be operated by a wagon or carriage. The projecting lip of the locking-spring R is curved toward the roadway, so as to act as an incline for the wheels of any vehicle, and the shifting bar U is given a wide bearing-surface, as shown in Fig. 3, and preferably provided with a depressed center to act as a guide for the wheels. On a narrow road the gate may be hung on a single post. The form shown in Fig. 3 is provided with a hand opening device for the convenience of pedestrians. The gate-post B is provided with elongated journals E, and the bearing Z for the upper journal is sufficiently high to permit a vertical play of the post sufficient to clear the gearing on its bottom surface. A spring, $d$, engaging a circumferential flange on the lower part of the post, is held under tension normally by a weight, W. The weight W is recessed, and slides freely between the post B and its supporting-bracket D. The weight carries a pin, V, engaging a spiral slot extending a quarter of a circle or more around the post B. A cord, Y, is attached to the weight, by which the latter can be lifted when the gate is to be opened. When the weight is raised, the spring $d$ is left free to act, and by its resiliency raises the post B, freeing its gear from engagement with that on rod H. The gate is then unlocked, and as the weight is raised farther the pin V rides up the spiral slot and opens the gate. When the cord is released, the weight gravitates back to its normal position, closes the gate, and again brings the gear-wheels into operative relation.

It will of course be understood that when the operation just described is performed on a double gate but one side of said gate is opened; also, that the said gate may be made of any pattern or material desired.

Having thus described my invention, what I claim, and desire to secure by Letters Patent, is—

1. In a gate, the combination of a shifting bar secured in the roadway, having pivotal movement in the direction of travel on the roadway, a locking device for said bar having a lip projecting beyond the end of the bar in position for engagement with a traveling vehicle, whereby the bar may be unlocked by an approaching vehicle, a rotative gate-post at the side of the roadway, and connections between the bar and the gate-post, whereby the latter may be turned and the gate opened when a vehicle rides upon the bar.

2. In a gate, the combination of a rotative gate-post at the side of the roadway, bearings for said post, a rock-shaft extending transverse to the roadway, gearing with said post, a shifting bar upon the roadway extending through the gate and having a continuous bearing-surface for the wheels of a vehicle, said bar having pivotal movement in the direction of travel, and connections between said bar and rock-shaft, whereby the latter may be rocked to open the gate when the vehicle rides upon the shifting bar.

3. In a gate, the combination of a rotative gate-post at the side of the roadway, bearings for said post, a rock-shaft extending into the roadway, engaging said post, a shifting bar upon the roadway, having a pivotal movement forward and backward, said bar extending beyond the gate at each side a sufficient distance to permit the wheels of an approaching vehicle to ride upon it before reaching the gate, a spring locking device at each end of the bar, a lip to the same projecting beyond the bar in the line of travel, and connections between the shifting bar and rock-shaft, whereby when an approaching vehicle rides on the bar the latter is unlocked and shifted to open the gate.

4. In a gate, the combination of a rotative gate-post at the side of the roadway, bearings for said post, a rock-shaft extending transverse to the roadway, gearing with said post, a shifting bar in the roadway, extending through the gate and having a continuous bearing-surface for the wheels of a vehicle, said bar having pivotal movement in the direction of travel, connections between said bar and rock-shaft, whereby the latter may be rocked to open the gate when a vehicle rides upon the shifting bar, and a spring engaged by said bar when shifted to restore the latter to its normal position when the vehicle has passed.

5. In a gate, the combination of a rotative gate-post at the side of the roadway, said post provided with a spiral slot in its side, bearings for said post, a slide at the side of the post, a handle to the slide, guides for said slide, and a projection on said slide engaging the slot in the post, whereby the gate may be opened by raising the slide.

6. In a gate, the combination of the rotative gate-post at the side of a roadway, said post provided with a spiral slot in its side, bearings for said post, a weight at the side of the post, guides for said weight, and a projection on the weight engaging the slot in the post, whereby the gate may be opened by raising the weight and automatically closed by the downward gravitation of the weight.

7. In a gate, the combination of a rotative gate-post at the side of the roadway, said post provided with a spiral slot in its side, elongated bearings for the same to permit of vertical movement, a slide at the side of the post, guides for said slide, a projection on said slide engaging the slot on the post, a rock-shaft in the road gearing with said post, means for rocking the shaft by an approaching vehicle, and a spring for lifting the post out of engagement with the rock-shaft, said spring being held away from the post when the slide is in its normal position, whereby when the slide is raised the gate may be freely turned by the co-operation of the slide and spiral slot.

8. In a gate, a post at each side of the roadway, each mounted in suitable bearings, gate-rods hung on said posts to normally obstruct travel, a rock-shaft extending across the roadway gearing with said gate-posts, a shifting bar in the roadway having pivotal movement in the direction of travel, operative connections between the bar and rock-shaft, and a lock at the end of the bar adapted to be released by an approaching vehicle, whereby when said vehicle rides upon the bar the gate will be opened, substantially as described.

9. In a gate, a bar supported in the roadway and having pivotal movement in the line of travel, a locking-spring at each end of the bar normally preventing shifting of the bar, and a lip to the spring projecting from the end of the bar in the path of an approaching vehicle, whereby the spring may be depressed and the bar released when a vehicle rides on said lip, as and for the purpose set forth.

10. In a gate, a bar supported in the roadway and having pivotal movement in the line of travel, a locking-spring at each end of the bar normally preventing a shifting of the bar, a lip to the spring projecting from the end of the bar in the path of an approaching vehicle, whereby the bar may be unlocked by an approaching vehicle, a rock-shaft transverse to the bar, vertical guides on said rock-shaft, a projection on the bar engaging said guides, and a rotative post carrying the gate-rods operated by said rock-shaft, as and for the purpose set forth.

11. In a gate, a pivoted shifting bar secured upon the roadway in the line of travel of a vehicle, said bar being movable in the line of travel, a rock-shaft engaged by said bar to open the gate, and a rigid locking device on said rock-shaft normally engaging the free end and preventing the opening of the gate, but releasing the same when the rock-shaft is operated, for the purpose set forth.

12. In a gate, the combination of a rotative gate-post at the side of the roadway, bearings for said post, a rock-shaft extending into the roadway, gearing with said post, a shifting bar upon the roadway having pivotal movement in the direction of travel, connections between said bar and rock-shaft, whereby the latter may be rocked to open the gate when a vehicle rides upon the shifting bar, a gate-body hung on said post, and a locking-arm carried by the rock-shaft engaging the free end of the gate when closed and permitting the same to swing open when the rock-shaft is operated.

In testimony whereof I affix my signature in presence of two witnesses.

PAYTON WADE ESTES.

Witnesses:
ELIAS MORER,
JAMES GRUBB.